T. P. HORGER.
SPRING WHEEL.
APPLICATION FILED FEB. 14, 1912.
1,048,969.
Patented Dec. 31, 1912.
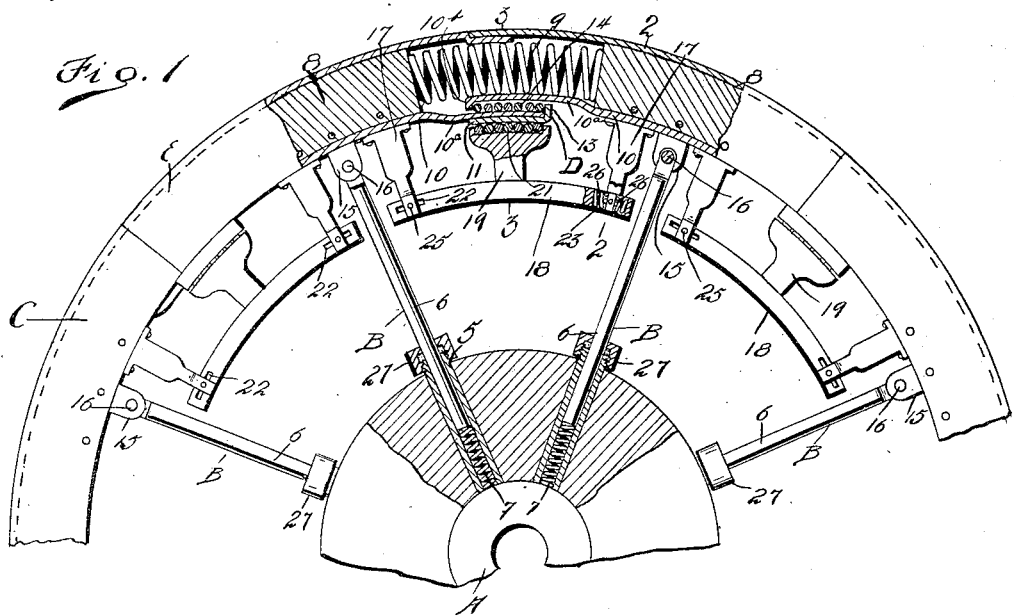
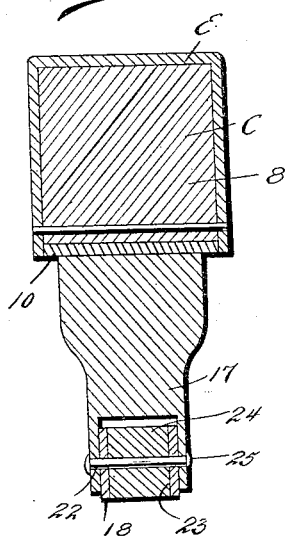
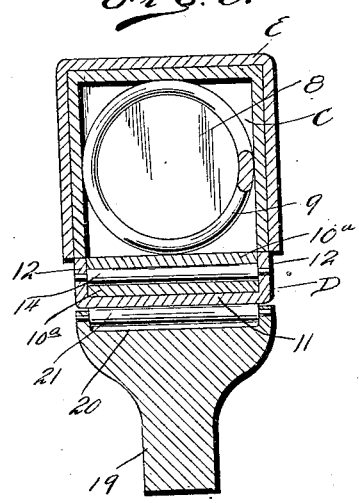
Inventor
T. P. Horger
Witnesses

UNITED STATES PATENT OFFICE.

THOMAS P. HORGER, OF ORANGEBURG, SOUTH CAROLINA.

SPRING-WHEEL.

1,048,969.

Specification of Letters Patent. Patented Dec. 31, 1912.

Application filed February 14, 1912. Serial No. 677,407.

*To all whom it may concern:*

Be it known that I, THOMAS P. HORGER, a citizen of the United States, residing at Orangeburg, in the county of Orangeburg, State of South Carolina, have invented certain new and useful Improvements in Spring-Wheels; and I do hereby declare the following to be a full, clear, and exact description of the invention, such as will enable others skilled in the art to which it appertains to make and use the same.

This invention relates to improvements in spring wheels.

The principal object of the invention is to provide a vehicle wheel which is designated to embody all the advantages of a pneumatic tired wheel.

Another object of the invention is to provide a wheel which includes a hub, a plurality of yieldable spokes and a plurality of separate felly sections respectively pivotally connected to the outer ends of the spokes and yieldably connected to each other, thereby not only permitting of the spokes yielding when passing over stones or other obstructions, but at the same time permitting a limited pivotal movement between an adjacent pair of felly sections.

A further object of the invention is to provide a sectional felly for wheels of the character described in which an improved means are provided for connecting the adjacent ends of the sections, whereby said sections will be held in their normal positions.

A still further object of the invention is to provide a spring wheel of the character described which is composed of a relatively few number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawing: Figure 1 is a partial view of a wheel constructed in accordance with my invention, parts thereof being shown in section, Fig. 2 is a detail sectional view taken on the line 2—2 of Fig. 1, and Fig. 3 is a detail sectional view taken on the line 3—3 of Fig. 1.

Like reference numerals designate corresponding parts in all the figures of the drawing.

Referring to the drawing, the invention comprises a hub A, a plurality of spokes B and a felly C. The spokes B each include an inner tubular section 5 and an outer telescopic section 6, the former being connected to the hub A. A coil spring 7 is disposed within the inner section 5 below the outer section 6 and tends to normally press the latter section outwardly. The felly C is formed from a plurality of spaced arcuate wooden sections 8. These sections are spaced equi-distant apart, and are yieldingly held in such relation by means of springs 9, said springs being respectively disposed between the ends of adjacent sections.

Secured to the inner face of each section 8 is a longitudinal metallic plate 10, the ends 10ª thereof projecting beyond the ends of the section. The adjacent ends 10ª of adjacent sections are disposed in overlapping relation and the outer plate 10 has its extreme end inwardly bent to form a stop 10ᵇ. A boxing D partially embraces the overlapping ends 10ª of said plates, and this boxing includes a bottom 11, side walls 12—12 and an end wall 13, the latter being disposed opposite the stop 10ᵇ of the outer plate, and forming a stop for the respective end of the inner plate. Transversely disposed roller bearings 14 are disposed between the overlapping ends 10ª of said plates, and these bearings have their ends journaled in the side walls 12 of the boxing D. It is to be observed in this connection that the stop 10ᵇ is disposed in spaced relation to the end 10ª of the inner plate, and the end wall or stop 13 is disposed in spaced relation to the end 10ª of the outer plate.

It will furthermore be observed that adjacent plates 10 are capable of having respective longitudinal movements one with the other.

Centrally depending from each plate 10 is a pair of spaced perforated ears 15—15 between which the outer ends of the outer sections 6 of the spokes B are disposed and are pivotally connected by pivot pins 16. As a result of this construction, it will be observed that the sections 8 of the felly C are capable of having longitudinal rocking movements upon the outer ends of the spokes, but are yieldingly held in their normal positions by means of the springs 9.

In order to support the meeting ends 10ᵃ of the plates 10 when adjacent sections are oscillated, there is secured to the inner face of adjacent ends of adjacent sections a pair of brackets 17—17, the inner ends of each bracket being bifurcated to form yokes which are respectively adapted to receive the ends of an arcuate supporting bar 18. Centrally projecting from the outer face of this bar and integral therewith is a post 19. This post is disposed directly below a respective boxing D, and is formed at its outer end with a recess 20 in which a plurality of transversely disposed roller bearings 21 are journaled, said bearings having engagement with the bottom 11 of said boxing. Formed in each end of the supporting bar 18 is a longitudinal vertical opening 22 and transversely disposed horizontal openings 23, the latter communicating with the former. Centrally disposed within the opening 22 is a sliding block 24, and carried by this block and projecting through the openings 23 is a pivot pin 25, the ends of said pin having pivotal engagement with the yoke of a respective bracket 17. Coil springs 26—26 are disposed within the vertical openings 22 on either side of the block 24, and serve to yieldingly retain said block centrally within the opening.

From the foregoing, it will be observed that when the wheel tends to pass over a stone or any other obstruction the adjacent section 8 of the felly will be oscillated, and as a result of the construction above outlined, the supporting bar 18 will swing upon its pivot 25, thereby retaining the post 19 in its proper relation with respect to the boxing D. By means of the coil springs 26, which are carried by the supporting bar 18, said bar will be permitted to yield longitudinally, and thereby serve to retain the post in its proper position with respect to the boxing.

In order to protect the wooden sections 8 and also to exclude dust and dirt from the parts above described, there is provided a plurality of inverted U-shaped casings E, each casing being disposed over and secured to a respective section 8 by means of transverse bolts or other suitable fastening means. The adjacent ends of these casings are preferably disposed in overlapping relation, as will be readily observed from an inspection of Fig. 1 of the drawing.

The outer end of each inner section 5 is exteriorly threaded for engagement with a packing nut 27 which will prevent oil or other lubricant which has been placed in the element from working out.

What is claimed is:

1. In a spring wheel, the combination with a hub, of a felly comprising a plurality of spaced sections, a longitudinally disposed plate secured to the inner face of each section and projecting beyond the ends thereof, the adjacent ends of adjacent plates being disposed in overlapping relation, a boxing disposed partially embracing the overlapping ends of each adjacent pair of plates, transverse roller bearings journaled in said boxing and disposed intermediate the overlapping ends of the plates, coil springs respectively disposed between the ends of adjacent sections, and supporting means for the boxings pivotally connected to the adjacent ends of the sections.

2. In a spring wheel, the combination with a hub, of a felly comprising a plurality of spaced sections, a longitudinally disposed plate secured to the inner face of each section and projecting beyond the ends thereof, the adjacent ends of adjacent plates being disposed in overlapping relation, brackets connected to the opposite ends of each section, a supporting bar pivotally connected to adjacent brackets of adjacent sections, and a post projecting from the bar for normally holding the overlapping ends of the plates against inward movement.

3. In a spring wheel, the combination with a hub, of a felly comprising a plurality of spaced sections, a longitudinally disposed plate secured to the inner face of each section and projecting beyond the ends thereof, the adjacent ends of adjacent plates being disposed in overlapping relation, the extreme end of the outer plate being inwardly bent to form a stop, a boxing partially embracing the overlapping ends of each adjacent pair of plates, said boxing including a bottom, side walls and end wall, the end wall projecting outwardly beyond the end of the inner plate, transverse roller bearings journaled in the side wall of the bracket and disposed between the overlapping ends of said plates, and supporting means for the boxings pivotally connected to the adjacent ends of the sections.

4. In a spring wheel, the combination with a hub, of a felly comprising a plurality of spaced sections, resilient spokes extending from the hub and having pivotal connections with the sections of the felly, yieldable connections between adjacent sections, brackets connected to the opposite ends of each section, a supporting bar pivotally connected to adjacent brackets of adjacent sections, and a post projecting from the bar for normally holding the yieldable connections between the sections against inward movement.

5. In a spring wheel, the combination with a hub, of a felly comprising a plurality of spaced sections, resilient spokes extending from the hub and having pivotal connections with adjacent sections of the felly, yieldable connections between adjacent sections, brackets connected to the opposite ends of each section and terminating in yokes at their inner ends, a supporting bar disposed below each yieldable connection, each bar being formed at each end with a vertical longitudinal slot and transversely disposed horizontal slots communicating with the former, a block centrally located within each vertical slot, springs respectively disposed in each slot on opposite sides of the block, a transverse pin carried by the block and projecting through the horizontal slots and having pivotal connection with the yokes of the respective brackets, and a post projecting from the bar for normally holding the yieldable connections between the sections against inward movement.

In testimony whereof, I affix my signature, in presence of two witnesses.

THOMAS P. HORGER.

Witnesses:
T. O. HIBBLE,
W. P. BRUNSON.

Copies of this patent may be obtained for five cents each, by addressing the "Commissioner of Patents, Washington, D. C."